United States Patent
Mishra et al.

(10) Patent No.: US 11,194,964 B2
(45) Date of Patent: Dec. 7, 2021

(54) REAL-TIME ASSESSMENT OF TEXT CONSISTENCY

(71) Applicant: International Business Machines Corporation, Armonk, NY (US)

(72) Inventors: Abhijit Mishra, Bangalore (IN); Anirban Laha, Chinsurah (IN); Parag Jain, Jabalpur (IN); Karthik Sankaranarayanan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 28 days.

(21) Appl. No.: 16/361,701

(22) Filed: Mar. 22, 2019

(65) Prior Publication Data

US 2020/0302011 A1 Sep. 24, 2020

(51) Int. Cl.
*G06F 40/253* (2020.01)
*G06F 16/332* (2019.01)
*G06F 40/30* (2020.01)
*G06F 40/166* (2020.01)
*G06F 40/242* (2020.01)

(52) U.S. Cl.
CPC ........ *G06F 40/253* (2020.01); *G06F 16/3322* (2019.01); *G06F 40/166* (2020.01); *G06F 40/242* (2020.01); *G06F 40/30* (2020.01)

(58) Field of Classification Search
CPC .. G06F 16/3322; G06F 40/166; G06F 40/242; G06F 40/30; G06F 40/253
See application file for complete search history.

(56) References Cited

U.S. PATENT DOCUMENTS

| | | | |
|---|---|---|---|
| 5,671,428 A | 9/1997 | Muranaga et al. | |
| 7,249,314 B2 | 7/2007 | Walker et al. | |
| 7,792,788 B2 | 9/2010 | Melmon et al. | |
| 7,797,274 B2 | 9/2010 | Stratheam et al. | |
| 7,822,631 B1 * | 10/2010 | Vander Mey | G06Q 10/06395 705/7.29 |
| 7,937,663 B2 | 5/2011 | Parker et al. | |
| 9,372,858 B1 | 6/2016 | Vagell et al. | |
| 9,413,739 B1 * | 8/2016 | Rose | H04L 63/08 |
| 9,715,476 B2 | 7/2017 | Megiddo et al. | |
| 9,817,805 B1 | 11/2017 | Markman et al. | |
| 9,959,296 B1 | 5/2018 | Gubin et al. | |
| 2005/0149367 A1 | 7/2005 | Lee et al. | |
| 2005/0256566 A1 * | 11/2005 | Gabbay | A61F 2/2487 623/2.1 |

(Continued)

OTHER PUBLICATIONS

N Ashwin et al., "Automated Content Suggestion for Document Writing," 2016 IEEE International Conference on Computational Intelligence and Computing Research (ICCIC), Dec. 2016, 6 pages. DOI: 10.1109/ICCIC.2016.7919528.

(Continued)

*Primary Examiner* — Kyle R Stork
(74) *Attorney, Agent, or Firm* — Kelsey M. Skodje

(57) ABSTRACT

Text suggestions are generated. A document is received, and a portion score for at least one portion of the document is generated. A global assessment score for at least two portions of the document is also generated. A variation between the portion score and the global assessment score is calculated. It is determined that the variation is above a threshold variation, and at least one text change suggestion is generated.

20 Claims, 5 Drawing Sheets

(56) References Cited

U.S. PATENT DOCUMENTS

| | | | |
|---|---|---|---|
| 2011/0113320 A1 | 5/2011 | Neff et al. | |
| 2011/0184727 A1 | 7/2011 | Connor | |
| 2012/0110445 A1 | 5/2012 | Greenspan et al. | |
| 2015/0208192 A1* | 7/2015 | Dugan | H04W 4/21 |
| | | | 455/414.3 |
| 2015/0370769 A1 | 12/2015 | Pereira Filho et al. | |
| 2016/0260026 A1* | 9/2016 | Kloetzer | G06K 9/6263 |
| 2018/0267950 A1 | 9/2018 | de Mello Brandao et al. | |
| 2018/0285326 A1* | 10/2018 | Goyal | G06F 40/166 |
| 2019/0272071 A1* | 9/2019 | Greenberger | G06F 40/169 |
| 2020/0293608 A1* | 9/2020 | Nelson | G06F 40/30 |

OTHER PUBLICATIONS

Bar-Haim et al., "Stance Classification of Context-Dependent Claims," Proceedings of the 15th Conference on the European Chapter of the Association for Computational Linguistics: vol. 1, Long Papers, 2017, pp. 251-261.

Carta, D., "5 Ways to Collaborate on Documents Online in Real Time," Mashable, Feb. 21, 2009, 16 pages. https://mashable.com/video/sony-ces-mike-fasulo/.

"Complex Sentence Generator," printed Feb. 8, 2019, 2 pages. https://www.csgenerator.com/.

Doersch, C., "Tutorial on Variational Autoencoders," Aug. 16, 2016 (last revised Aug. 13, 2016), pp. 1-23. https://arxiv.org/abs/1606.05908.

Greene, J., "Free Writing Software: 15 Tools to Help You Create Better Content, Faster: Find the best brainstorming, researching, writing, and editing tools," Zapier, Jan. 29, 2019, 2 pages. https://zapier.com/blog/writing-editing-apps/.

Henderson et al., "Efficient Natural Language Response Suggestion for Smart Reply," May 1, 2017, 15 pages. https://arxiv.org/abs/1705.00652.

McNeill et al., "Merging Stories with Shallow Semantics," KRAQ '06: Proceedings of the Workshop KRAQ '06 on Knowledge and Reasoning for Language Processing, Apr. 2006, pp. 36-41.

Recasens et al., "Linguistic Models for Analyzing and Detecting Biased Language," Proceedings of the 51st Annual Meeting of the Association for Computational Linguistics, Aug. 2013, pp. 1650-1659.

Wan et al., "Merging Sentences using Shallow Semantic Analysis: A First Experiment," 2001, pp. 1-8. https://www.semanticscholar.org/paper/1-Merging-Sentences-using-Shallow-Semantic-Analysis-Wan-Dale/f710ed4b2bd4071cb33445ccb76eb611a4851784.

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

Jain et al., "Unsupervised Tunable Stylized Text Transformations," U.S. Appl. No. 16/046,139, filed Jul. 26, 2018.

* cited by examiner

REAL-TIME ASSESSMENT OF TEXT CONSISTENCY

BACKGROUND

The present disclosure relates to text document revision and, more specifically, to the generation of text suggestions based on real-time assessment of text document consistency.

Text editing programs can provide tools for facilitating collaboration and/or automatically generating suggested changes when spelling or grammar mistakes are detected in a text document. Editing programs can track and display revisions made by each contributor to the document. For example, revisions such as comments can be displayed in boxes, additions to the document can be highlighted or underlined, and deletions can be crossed out. These annotations and changes can then be viewed, annotated, edited, accepted, and/or rejected by other contributors.

SUMMARY

Various embodiments are directed to a method of generating text suggestions, which includes receiving a document. The method also includes generating a portion score for at least one portion of the document, and generating a global assessment score for at least two portions of the document. Further, the method includes calculating the variation between the portion score and the global assessment score, determining that the variation is above a threshold variation, and generating at least one text change suggestion. In some embodiments, the global assessment score and the portion score are based on semantic artifacts, which can include bias-based semantic artifacts, correctness-based semantic artifacts, and coherence-based semantic artifacts. The global assessment score and the portion score can also be based on semantic artifacts and contributor scores. The text change suggestion can also indicate that the at least one portion contains information that contradicts information in at least one portion of the at least two portions of the document. The method can also include identifying at least one leader from at least two contributors to the document, and generating the global assessment score based on scores for portions of the document contributed by the at least one leader.

Further embodiments are directed to a system, which includes at least one processing component, at least one memory component, a display screen configured to display a document, a dictionary, and an editing module. The editing module includes an assessment module configured to receive a document, generate a portion score for at least one portion of the document, generate a global assessment score for at least two portions of the document, and calculate a variation between the portion score and the global assessment score. The editing module also includes a suggestion module configured to generate at least one text change suggestion. In some embodiments, the global assessment score and the portion score are based on semantic artifacts, which can include bias-based semantic artifacts, correctness-based semantic artifacts, and coherence-based semantic artifacts. The global assessment score and the portion score can also be based on semantic artifacts and contributor scores. In some embodiments, the assessment module is further configured to identify at least one leader from at least two contributors to the document, and generate the global assessment score based on scores for portions of the document contributed by the at least one leader. The system can also include a set of contributor profiles.

Additional embodiments are directed to a computer program product for generating text change suggestions. The computer program product includes a computer readable storage medium having program instructions embodied therewith, the program instructions executable by a processor to cause the device to perform a method. The method includes receiving a document, generating a portion score for at least one portion of the document, and generating a global assessment score for at least two portions of the document. The method also includes calculating the variation between the portion score and the global assessment score, determining that the variation is above a threshold score, and generating at least one text change suggestion. In some embodiments, the global assessment score and the portion score are based on semantic artifacts, which can include bias-based semantic artifacts, correctness-based semantic artifacts, and coherence-based semantic artifacts. The global assessment score and the portion score can also be based on semantic artifacts and contributor scores. The method can also include identifying at least one leader from at least two contributors to the document, and generating the global assessment score based on scores for portions of the document contributed by the at least one leader.

DETAILED DESCRIPTION

Text editing programs often include tools for tracking changes, suggesting spelling and grammar changes, and inserting comments. These tools can be used by a user who is the sole author of the document or for collaborative editing when a document has more than one contributor (e.g., coauthors, editors, reviewers, etc.). The contributors can have different roles and relationships to one another. For example, contributors can be peers, students, subject matter experts, supervisors, instructors, etc. When different contributors add portions of text to a document, there can be inconsistent portions. For example, contributors can have different levels of writing proficiency or subject matter expertise. Contributors can also write in different styles. However, a document can have inconsistent portions even when it is written by a single author.

Inconsistencies in a text document can reduce the coherency, readability, and accuracy of the document. For example, a scientific paper is less likely to be accepted to a peer-reviewed journal if parts of the document are not written in a standard scientific writing style. Additionally, information (e.g., statements of fact or opinion) in one portion of a document may contradict information in another portion. It can be difficult for contributors to recognize and/or correct inconsistent portions, particularly if some contributors lack experience with the subject matter or writing style.

A method for identifying inconsistent portions in a text document and providing suggested changes to the text in real time is disclosed herein. A score is determined for the document based on a global assessment of the document's full text or combined portions of text added by selected contributors (e.g., contributors who are more senior or knowledgeable). Scores are also determined for portions of the text. The portion scores are compared to the global assessment score in order to determine whether there are portions inconsistent with the document or combined portions of the document. If a portion of text has a score with a variation from the global assessment score that is above a variation threshold, the portion is considered inconsistent. A notification and suggested changes can then be provided.

Figure 1:
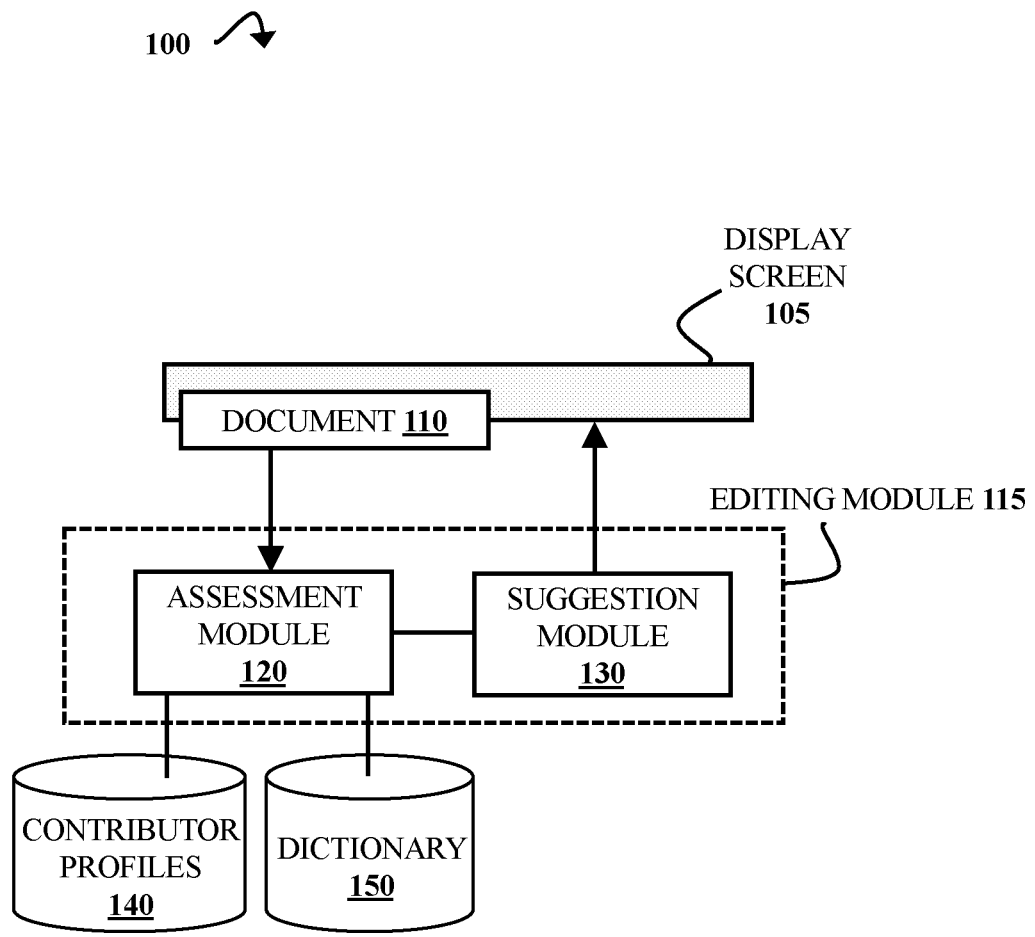
FIG. 1 is a block diagram illustrating a text editing environment, according to some embodiments of the present disclosure.

FIG. 1 is a block diagram illustrating a text editing environment 100, according to some embodiments of the present disclosure. The collaborative editing environment 100 includes a display screen 105 displaying a text document 110. The display screen 105 includes a user interface (not shown) through which a user can view and edit the document 110. The display screen 105 is part of a device (illustrated in FIG. 3) that provides visual, audio, or both types of data. Examples of a device such as this can include a desktop computer, a laptop computer, a mobile computing device, a tablet computer, etc. The display screen 105 can also be part of a standalone device (e.g., a computer monitor, television, or handheld device display) connected to a display system.

The document 110 includes portions of text written by at least one contributor. Herein, the contributor is a user who is contributing to the document 110 in real time. In some embodiments, the document 110 is a text document in a word processing program. However, the document 110 can be a presentation, portable digital format (PDF) file, spreadsheet, or any other document that contains editable text. In addition to text, the document 110 can include other types of content (e.g., tables, graphical images, videos, and/or audio recordings). The document 110 text portions can also come from speech data gathered from an audio recording by at least one speech-to-text engine. As the document 110 is edited, new text portions can be added by one or more contributors.

The text editing environment 100 also includes components for analyzing the document 110 and generating suggested text. These tools include an editing module 115, which includes an assessment module 120 and a suggestion module 130. The text editing environment 100 also includes a set of contributor profiles 140, and a dictionary 150 of predefined terms.

The assessment module 120 generates scores based on a global assessment of the document 110 and assessments of portions of the document 110. The assessment module 120 can also generate scores based on global assessments of combined portions of the document 110. For example, the global assessment can include all document portions other than those of a selected contributor (e.g., the user). Document 110 portions can be defined by which of the contributors entered the portions. However, portions can also be defined by topic or any other category (e.g., paragraphs, sections, sentences, phrases, etc.). The assessments are based on natural language aspects, identification of influential text portions, and optionally, contributor information.

The assessment module 120 compares the scores calculated for portions of the document 110 with the score for the global assessment. Variations between the global assessment score and portion scores are calculated. The variation (e.g., mean squared error) between a score for a portion of the document 110 and the global assessment score indicates whether the portion is inconsistent with the rest of the document 110 or combined portions of the document 110. For example, a variation greater than or equal to a threshold variation can indicate that the portion is inconsistent. Techniques for generating scores are discussed in greater detail with respect to FIG. 2.

The suggestion module 130 generates notifications and/or suggested text changes when inconsistent text portions are located. For example, the suggestion module 130 can generate text change suggestions (e.g., for rephrasing, word replacement, or corrections) for the portions using style-based text transformers with conditional variational autoencoders for sampling the generated suggestions. The selection module 130 can then select at least one text change that will reduce the portion's variation to below a threshold variation. However, the selection module 130 can also select a change that merely reduces the variation, such as when no change is found that will lower the variation to below the threshold. When there is no change that will lower the variation to below the threshold, the notification can also indicate that there is an inconsistency with no suggested changes. The suggestion module 130 can also suggest information corrections or text deletions. Examples of text suggestions are discussed in greater detail with respect to FIG. 2.

The contributor profiles 140 include information about each contributor. This information can include contributor names, levels of expertise, role (e.g., primary author, supervisor, or student), etc. The assessment module 120 can determine contributor scores based on the information in the contributor profiles 140. Based on the scores, the assessment module 120 can group the contributors into one or more "leaders" and one or more "followers". The leaders can be contributors with higher contributor scores (e.g., the top score, a score in the top 5% of scores, or a score above a threshold contributor score). However, the leader and follower roles can also be specified in the contributor profiles 140. In some embodiments, the contributor profiles 140 are not included in the text editing environment 100. For example, the assessment module 120 can gather contributor information from internet sources, an internal directory, or a contributor questionnaire. The document 110 assessment can optionally be carried out without contributor scores in these instances.

The dictionary 150 is a database of predefined semantic artifacts. The semantic artifacts are words, phrases, or any lexical units. The dictionary 150 can include at least one domain-specific lexicon. A domain is a particular topic, sentiment, or field (e.g., science, journalism, fiction, etc.). The dictionary 150 can be any source of semantic data (e.g., a machine-readable dictionary or semantic database). Semantic artifacts are discussed in greater detail with respect to FIG. 2.

Figure 2:
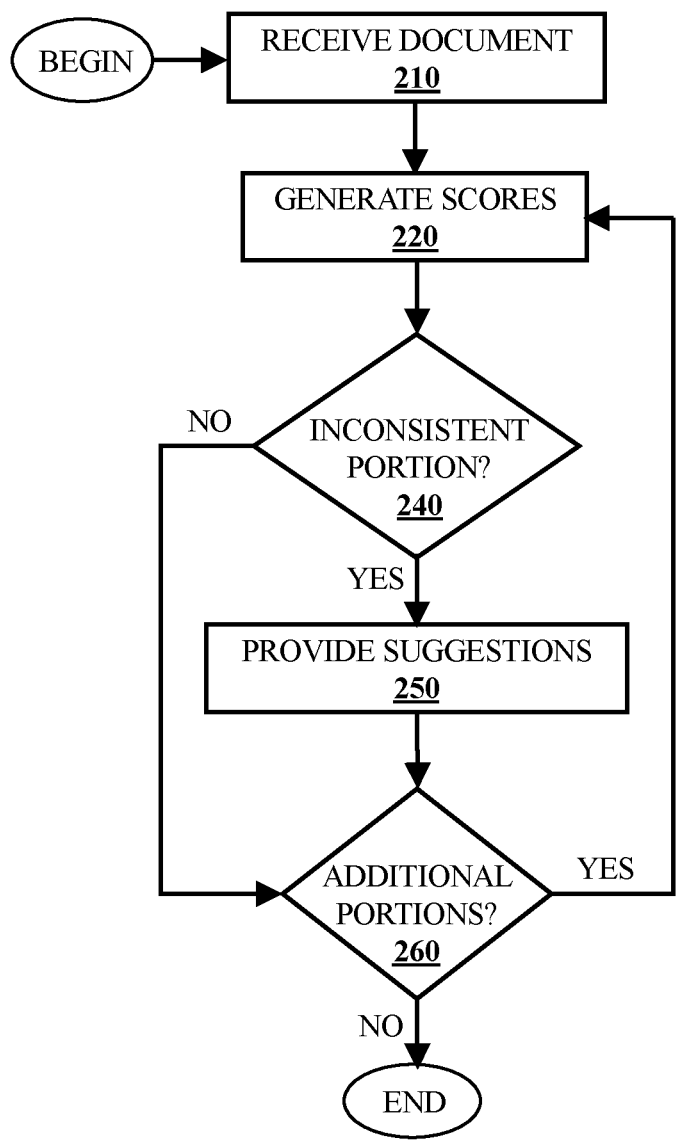
FIG. 2 is a flow diagram illustrating a process of identifying inconsistent portions in a text document and providing suggested changes, according to some embodiments of the present disclosure.

FIG. 2 is a flow diagram illustrating a process 200 of identifying inconsistent portions in a text document and providing suggested changes to the text, according to some embodiments of the present disclosure. To illustrate process 200, but not to limit embodiments, FIG. 2 is described within the context of the collaborative editing environment 100 of FIG. 1. Where elements shown in FIG. 2 are identical to elements shown in FIG. 1, the same reference numbers are used in both Figures.

Process 200 begins when a text document 110 is received. This is illustrated at step 210. The document 110 is reviewed and edited by a user through a user interface on a display screen 105. The user is an individual accessing and optionally editing the document 110 in real time. In some embodiments, the user is the only contributor to the document 110. However, the document 110 can also have one or more additional contributors who have authored portions of the document.

Scores based on global and portion assessments of the document 110 are then generated. This is illustrated at step 220. The assessment module 120 computes global assessment scores for the full text of the document 110, scores for individual contributor portions, and optionally, combined scores for portions of text entered by one or more contributors. Variations between a global assessment score and contributor portion scores indicate how much each portion deviates from the global assessment. The assessment module 120 gathers information from the document 110 in order to generate these scores. The gathered information includes relevant semantic artifacts and identified influential portions of text. In some embodiments, contributor information from the contributor profiles 140 is also used to generate the scores.

Relevant semantic artifacts are identified based on predefined artifacts from the dictionary 150. The semantic artifacts are grouped into classification-based, logic-based, and bias-based artifacts. The assessment module 120 calculates a score for each identified semantic artifact, and then determines aggregated scores for the groupings. Influential portions of the document can be identified and assigned greater value in the assessments. However, in some embodiments the scores are calculated without identifying influential portions. In some embodiments, the scores are based on all semantic artifact groupings. However, scores can also be calculated based on fewer semantic artifact groupings or alternative semantic artifact groupings (e.g., opinion-based).

Classification-based semantic artifacts can include formality, politeness, sentiment, tone, voice, tense, humor, certainty, precision, etc. Classification-based semantic artifacts can be scored using pre-trained recurrent neural network (RNN) classifiers or other techniques for natural language processing and text analysis. Examples of these techniques can include Hidden Markov models (HMM), statistical models, decision tree algorithms, supervised machine learning algorithms, semi-supervised machine learning algorithms, unsupervised machine learning algorithms, text mining, naïve B ayes classifiers, latent semantic indexing, multimodal sentiment analysis, etc. Particular regions (e.g., words, phrases and sentences) that influence the score can be identified using attention weights from the classifier. Portions of the document 110 that include these regions can be considered influential portions.

Logic-based semantic artifacts are scored based on complexity, correctness, and/or coherence. Complexity and related influential regions can be determined based on scores produced by Flesch-Kincaid readability tests and language models trained on complex text. However, any appropriate measure of semantic or syntactic complexity can be used. Additional examples of techniques for determining complexity can include the Dale-Chall readability formula, the Gunning Fog Index readability formula, the Fry readability formula, the Raygor readability estimate, the Laesbarheds Index (LIX), the Automated Readability Index (ARI), etc.

Correctness scores can be determined by extracting triples { subject, predicate, object} from the document 110 text, locating domain-specific text in the triples, followed by triple standardization (e.g., by entity resolution with canonicalization). Domain-specific triples from one or more domains can be included in the dictionary 150. Correctness scores are measured by matching the extracted triples and domain-specific triples from the dictionary 150. Influential portions of the document 110 can include portions having sentences containing these matched triples.

Additionally, correctness scores can take into account discrepancies between portions of the document. For example, a portion written by the user can contain information that contradicts information in a portion written by another contributor. This can result in a lowered correctness score and/or a notification. For example, if the user has a higher contributor score than the contributor responsible for the contradictory information, the user can be notified of the discrepancy without the correctness score being lowered. However, if multiple portions written by other contributors include information that is contradicted by the user, the correctness score can also be lowered.

Global and portion coherence scores are based on topical coherence scores, local coherence scores, or a combination thereof. Portions of the document 110 that are most influential to the global coherence score can be identified based on maximum and/or minimum threshold portion coherence scores. Topical coherence scores can be determined by clustering sentences in the document 110 into predefined topics/clusters (e.g., using Latent Dirichlet Allocation (LDA) topic modeling, LDA with HMM, Latent Semantic Analysis, Probabilistic Latent Semantic Analysis (PLSA), etc.), and comparing the clusters' membership distributions using a Kullback-Leibler (KL)-divergence metric.

Local coherence is scored by determining word/concept overlap between consecutive sentences aggregated over the whole document 110 or portions of the document 110. Additional similarity measures that can be used to determine coherence between predefined topics/clusters and consecutive sentences can include Normalized Pointwise Mutual Information (NPMI) similarity, Leacock-Chodorow similarity, Wu-Palmer similarity, Hirst-St. Onge similarity, Lesk similarity, Jiang-Conrath similarity, Resnik Information Content, Lin similarity, context vectors, Related Article Concept Overlap (RACO), etc.

Bias-based semantic artifacts are scored based on demographic bias, domain bias, and/or role bias. Demographic bias is scored based on detection of text matching predefined demographic keywords from the dictionary 150. Domain bias is scored by identifying domain-specific entities in the document 110 (e.g., based on domain-specific keywords or triples from the dictionary 150), as well as text near the entities that provides context. The context of the same entities identified in the dictionary 150 is compared (e.g., by cosine similarity of the text) to the context of the identified entities in the document 110. Influential portions of the document 110 can be portions having words indicating the domain-specific entities and context. Role bias is scored by identifying the most common entities in the text, and then determining scores for stance or polarity toward these entities using natural language processing techniques. Influential portions can be identified as portions having entities with stance/polarity scores having mean squared errors that significantly (e.g., at or above a threshold error) deviate from the average score.

Contributor scores can also be determined. For example, the assessment module 120 can use information from contributor profiles 140 to calculate contributor scores for portions of the document 110. The contributor scoring criteria can include information such as the contributor's role (e.g., team leader, primary author, secondary author, professor, student, etc.), educational background, level of experience, etc. For example, higher contributor scores could be assigned to roles such as team leader or primary author or to contributors with greater domain-specific expertise. The assessment module 120 can use multiple-criteria decision making analysis processes or statistical methods (e.g., Bayesian networks or hierarchical linear models) to calculate contributor-based scores. However, preset scores can also be assigned to different contributor roles. For example, a group leader may always have a score of ten on a scale of one to ten. Contributor scores can also be entered by the user.

It is then determined whether there are inconsistent portions of the document 110. This is illustrated at step 240. The assessment module 120 calculates variations between scores for the portions of the document 110 and the global assessment score for the whole document 110. Additionally, the variation between the portion scores and a global assessment score for selected combined portions of the document 110 (e.g., leader-contributed portions or user-excluded portions) can be determined. In some embodiments, variation determinations are based on mean squared error. However, any appropriate measure of variability can be used (e.g., root-mean-squared error or standard deviation).

A portion of the document 110 can be considered inconsistent when it has a score with a variation above a threshold variation. The score can be an aggregate score for the portion based on semantic artifact grouping scores and, optionally, contributor information. However, a portion can also be considered inconsistent when it has at least one score for a grouping of semantic artifacts and/or contributor over the threshold. The assessment module 120 can also determine that portions of the document 110 added by different contributors contain essentially the same information. The redundant portion contributed by a contributor with a lower contributor score can be considered inconsistent in these instances.

If the portion is determined to be inconsistent at step 240, text change suggestions are provided. This is illustrated at step 250. However, if all portions are determined to be consistent, process 200 proceeds directly to step 260, whereupon it is determined whether there are additional portions of the document. Step 260 is discussed in greater detail below. At step 250, various text change suggestions are generated and communicated to the user. These text change suggestions can include changes to words, numbers, phrases, sentences, etc. There can also be text change suggestions that flag portions of the document that include information discrepancies or redundancies. When redundant or conflicting portions are added by different contributors, the suggestion module 130 can suggest removing the portion written by the contributor with a lower contributor score.

In some embodiments, the suggestion module 130 generates suggestions using neural text generation. A language model is built for the consistent portions of the document (e.g., all consistent portions, consistent portions contributed by contributors with high contributor score, or user-selected portions). The language model can be built using recurrent neural networks, such as Long Short Term Memory (LSTM) networks or Gated Recurrent Unit (GRU) networks. Suggested text can then be generated using conditional language models. The suggestion module 130 can also generate text suggestions using techniques such as variational autoencoders or conditional variational autoencoders.

However, any appropriate text generation or suggestion technique can be used. For example, the suggestion module 130 can carry out synonym replacement, stop-word introduction, and morphological variations on each sentence in an inconsistent portion. In some embodiments, the text change suggestions are generated using style-based text transformers. The suggestion module 130 can also generate suggestions based on dictionaries, databases, and user acceptance/rejection patterns for previous suggestions.

The suggestion module 130 determines the variation that would result from each of the generated text change suggestions. At least one of the suggestions is then displayed on the display screen 105. For example, the suggestion module 130 can select text change suggestions that will lower the inconsistent portion's variation to below the threshold variation. The suggestion module 130 can also select text changes that will reduce the variation without necessarily causing the variation to decrease to below the threshold. The suggestion module 130 can also generate a notification indicating that the portion is inconsistent with at least part of the document 110 with or without including suggested changes. The notification can include information about the type of inconsistency (e.g., redundancy, discrepancy, type of semantic artifact grouping, etc.).

The generated text changes and/or notifications can be automatically displayed on the display screen 105 or the user can select an option for viewing text change suggestions. However, the suggestions can be communicated in other ways (e.g., as audio messages). The user can select one of the suggested changes or make alternative text changes. The user can also take no action or select an option for ignoring or dismissing the inconsistency.

It is then determined whether there are additional portions of the document 110 that have not yet been scored. This is illustrated at step 260. For example, new portions may have been added to the document 110 after the scoring at step 220. Additional portions can also be portions that have been edited since the scoring process at step 220. In some embodiments, only selected text portions are scored at step 220. If unscored portions are later selected, these portions can be located as additional portions at step 240. If additional portions are located, process 200 returns to step 220, and determines new scores for the document 110 portions. However, if no additional portions are located, process 200 ends. Process 200 can also end when the user selects an option for turning off the process or exits the document 110 editing program.

Figure 3:
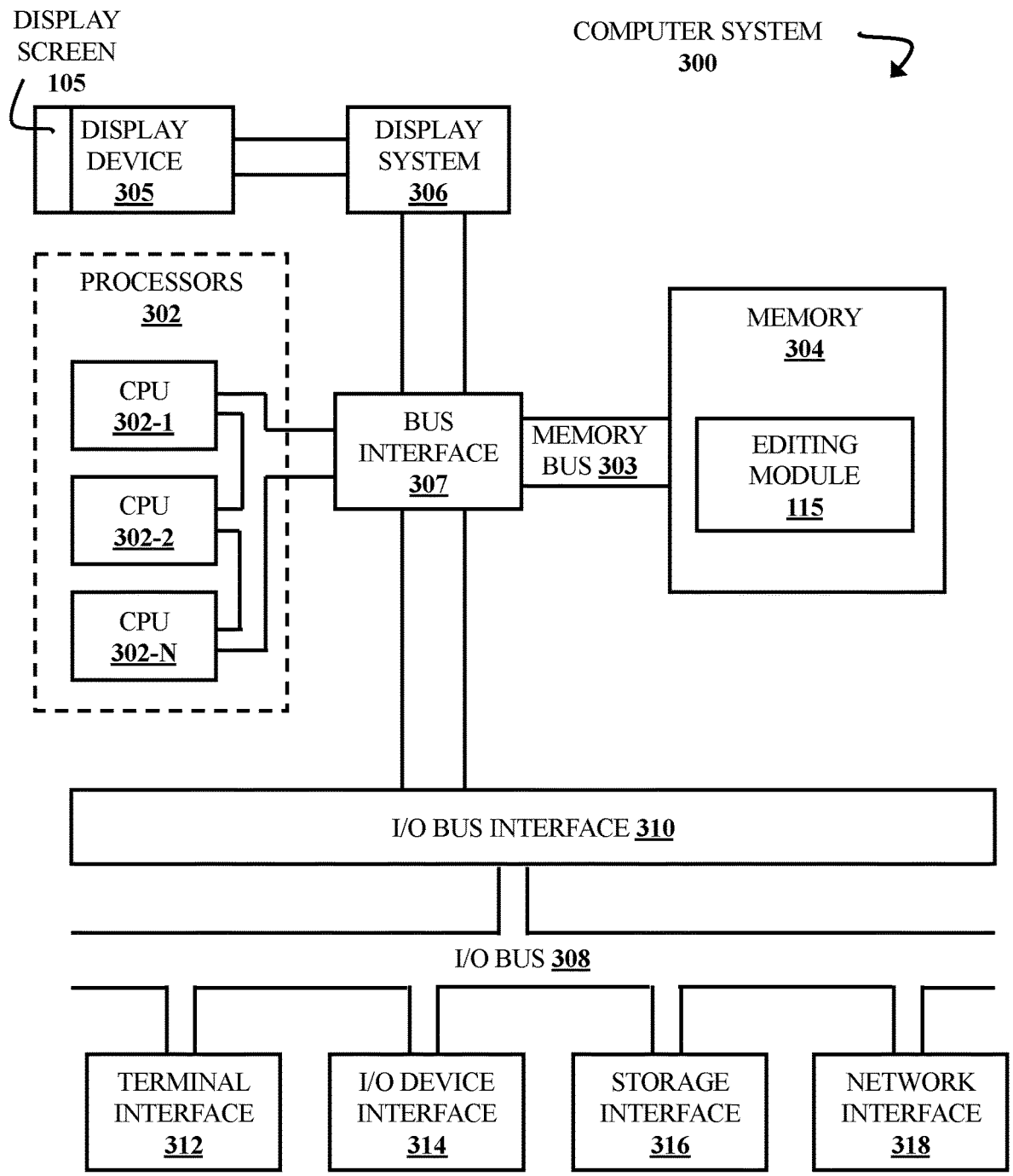
FIG. 3 is a block diagram illustrating a computer system, according to some embodiments of the present disclosure.

FIG. 3 is a high-level block diagram illustrating an exemplary computer system 300 that can be used in implementing one or more of the methods, tools, components, and any related functions described herein (e.g., using one or more processor circuits or computer processors of the computer). In some embodiments, the major components of the computer system 300 comprise one or more processors 302, a memory subsystem 304, a terminal interface 312, a storage interface 316, an input/output device interface 314, and a network interface 318, all of which can be communicatively coupled, directly or indirectly, for inter-component communication via a memory bus 303, an input/output bus 308, bus interface unit 307, and an input/output bus interface unit 310.

The computer system 300 contains one or more general-purpose programmable central processing units (CPUs) 302-1, 302-2, and 302-N, herein collectively referred to as the CPU 302. In some embodiments, the computer system 300 contains multiple processors typical of a relatively large system; however, in other embodiments the computer system 300 can alternatively be a single CPU system. Each CPU 302 may execute instructions stored in the memory subsystem 310 and can include one or more levels of on-board cache.

The memory 304 can include a random-access semiconductor memory, storage device, or storage medium (either volatile or non-volatile) for storing or encoding data and programs. In some embodiments, the memory 304 represents the entire virtual memory of the computer system 300, and may also include the virtual memory of other computer systems coupled to the computer system 300 or connected via a network. The memory 304 is conceptually a single monolithic entity, but in other embodiments the memory 304 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory can be further distributed and associated with different CPUs or sets of CPUs, as is known in any of various so-called non-uniform memory access (NUMA) computer architectures. The memory 304 also contains an editing module 115, which includes an assessment module 120 and a suggestion module 130 (illustrated in FIG. 1).

These components are illustrated as being included within the memory 304 in the computer system 300. However, in other embodiments, some or all of these components may be on different computer systems and may be accessed remotely, e.g., via a network. The computer system 300 may use virtual addressing mechanisms that allow the programs of the computer system 300 to behave as if they only have access to a large, single storage entity instead of access to multiple, smaller storage entities. Thus, though the editing module 115 is illustrated as being included within the memory 304, components of the memory 304 are not necessarily all completely contained in the same storage device at the same time. Further, although these components are illustrated as being separate entities, in other embodiments some of these components, portions of some of these components, or all of these components may be packaged together.

In an embodiment, the editing module 115 includes instructions that execute on the processor 302 or instructions that are interpreted by instructions that execute on the processor 302 to carry out the functions as further described in this disclosure. In another embodiment, the editing module 115 is implemented in hardware via semiconductor devices, chips, logical gates, circuits, circuit cards, and/or other physical hardware devices in lieu of, or in addition to, a processor-based system. In another embodiment, the editing module 115 includes data in addition to instructions.

Although the memory bus 303 is shown in FIG. 3 as a single bus structure providing a direct communication path among the CPUs 302, the memory subsystem 310, the display system 306, the bus interface 307, and the input/output bus interface 310, the memory bus 303 can, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the input/output bus interface 310 and the input/output bus 308 are shown as single respective units, the computer system 300 may, in some embodiments, contain multiple input/output bus interface units 310, multiple input/output buses 308, or both. Further, while multiple input/output interface units are shown, which separate the input/output bus 308 from various communications paths running to the various input/output devices, in other embodiments some or all of the input/output devices may be connected directly to one or more system input/output buses.

The computer system 300 may include a bus interface unit 307 to handle communications among the processor 302, the memory 304, a display system 306, and the input/output bus interface unit 310. The input/output bus interface unit 310 may be coupled with the input/output bus 308 for transferring data to and from the various input/output units. The input/output bus interface unit 310 communicates with multiple input/output interface units 312, 314, 316, and 318, which are also known as input/output processors (IOPs) or input/output adapters (IOAs), through the input/output bus 308. The display system 306 may include a display controller. The display controller may provide visual, audio, or both types of data to a display device 305, which includes a display screen 105 for viewing a document 110 (FIG. 1). The display system 306 may be coupled with a display device 305, such as a standalone display screen, computer monitor, television, or a tablet or handheld device display. In alternate embodiments, one or more of the functions provided by the display system 306 may be on board a processor 302 integrated circuit. In addition, one or more of the functions provided by the bus interface unit 307 may be on board a processor 302 integrated circuit.

In some embodiments, the computer system 300 is a multi-user mainframe computer system, a single-user system, or a server computer or similar device that has little or no direct user interface, but receives requests from other computer systems (clients). Further, in some embodiments, the computer system 300 is implemented as a desktop computer, portable computer, laptop or notebook computer, tablet computer, pocket computer, telephone, smart phone, network switches or routers, or any other appropriate type of electronic device.

It is noted that FIG. 3 is intended to depict the representative major components of an exemplary computer system 300. In some embodiments, however, individual components may have greater or lesser complexity than as represented in FIG. 3, Components other than or in addition to those shown in FIG. 3 may be present, and the number, type, and configuration of such components may vary.

In some embodiments, the data storage and retrieval processes described herein could be implemented in a cloud computing environment, which is described below with respect to FIGS. 4 and 5. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
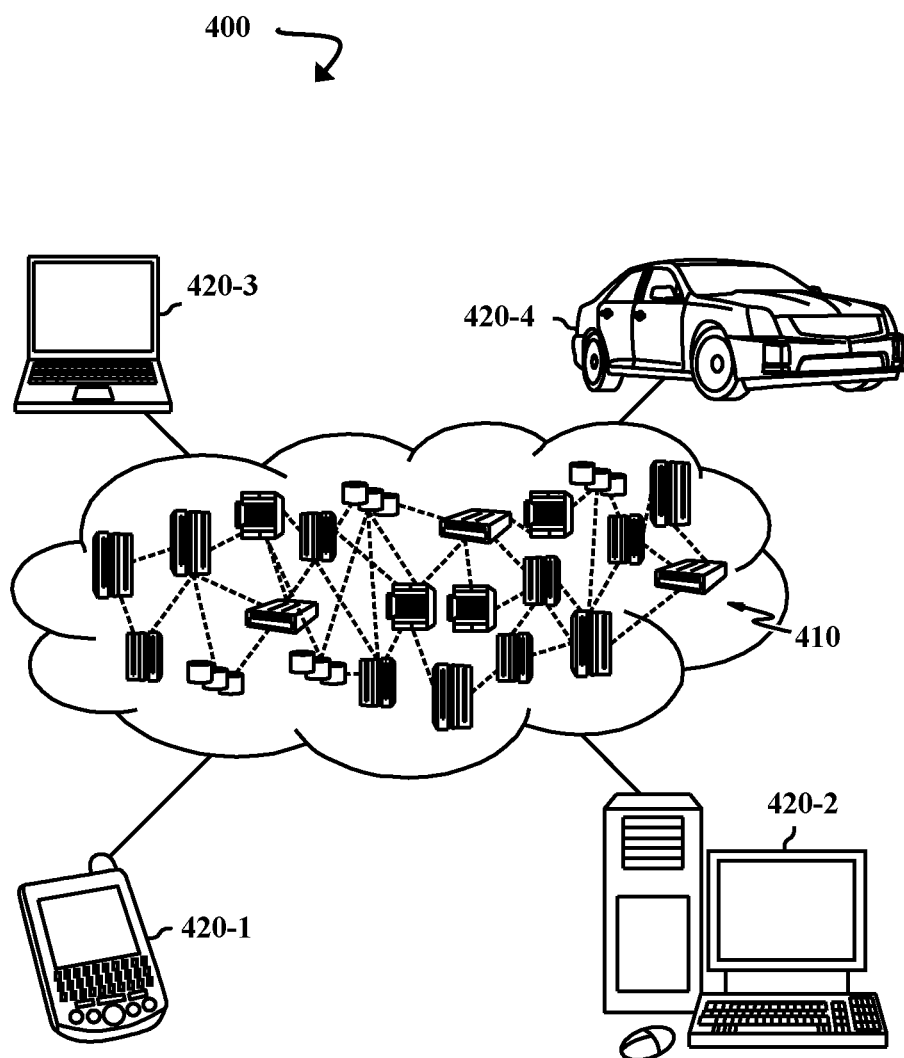
FIG. 4 is a block diagram illustrating a cloud computing environment, according to some embodiments of the present disclosure.

FIG. 4 is a block diagram illustrating a cloud computing environment 400, according to some embodiments of the present disclosure. As shown, cloud computing environment 400 includes one or more cloud computing nodes 410 with which local computing devices used by cloud consumers, such as, for example, personal digital assistant (PDA) or cellular telephone 420-1, desktop computer 420-2, laptop computer 420-3, and/or automobile computer system 420-4 may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 420-1-420-4 shown in FIG. 4 are intended to be illustrative only and that computing nodes 410 and cloud computing environment 400 can communicate with any type of computerized device over any type of network and/or network addressable connection (e.g., using a web browser).

Figure 5:
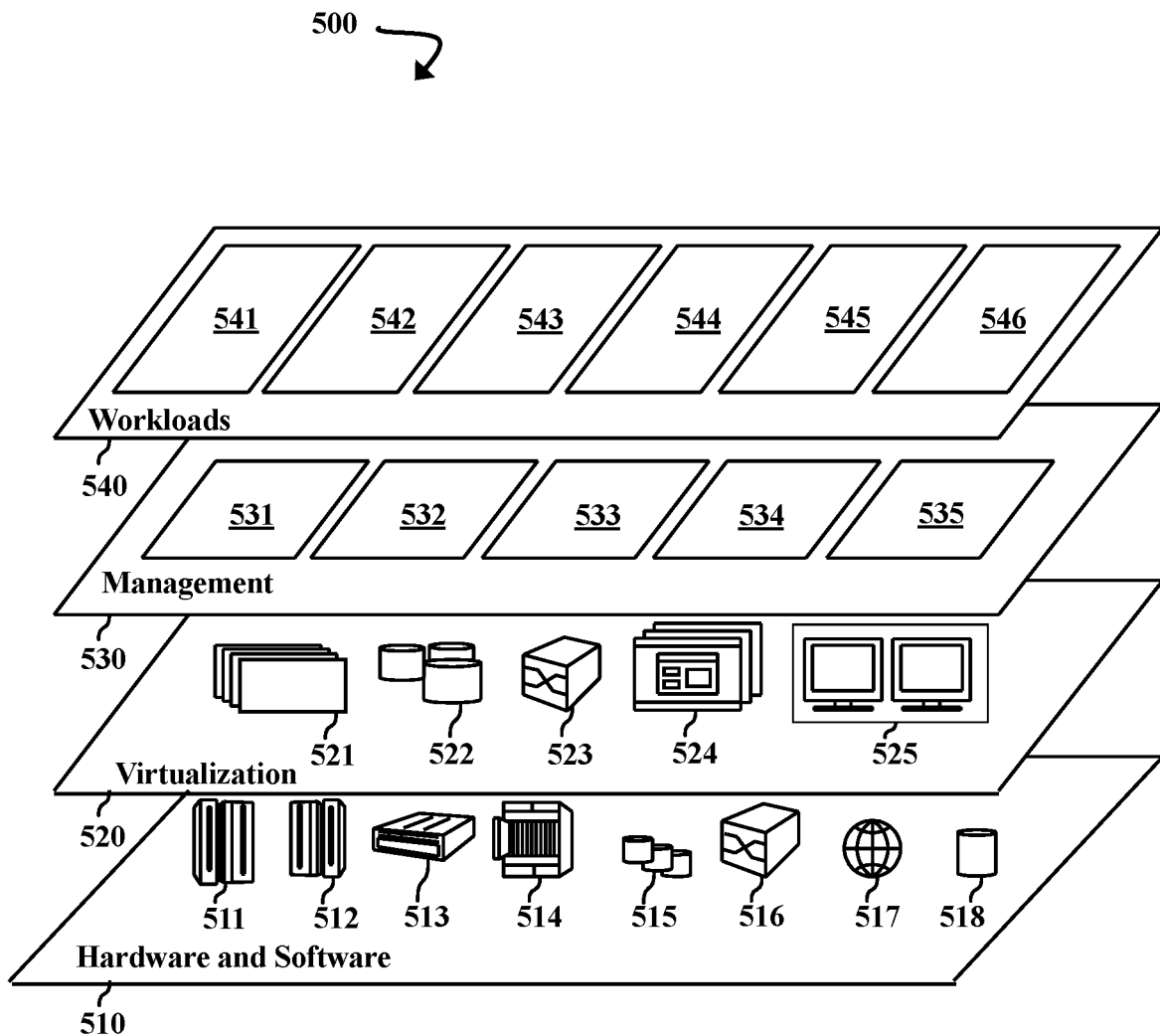
FIG. 5 is a block diagram illustrating a set of functional abstraction model layers provided by the cloud computing environment, according to some embodiments of the present disclosure.

FIG. 5 is a block diagram illustrating a set of functional abstraction model layers 300 provided by the cloud computing environment 400, according to some embodiments of the present disclosure. It should be understood in advance that the components, layers, and functions shown in FIG. 5 are intended to be illustrative only and embodiments of the invention are not limited thereto. As depicted, the following layers and corresponding functions are provided:

Hardware and software layer 510 includes hardware and software components. Examples of hardware components include: mainframes 511; RISC (Reduced Instruction Set Computer) architecture-based servers 512; servers 513; blade servers 514; storage devices 515; and networks and networking components 516. In some embodiments, software components include network application server software 517 and database software 518.

Virtualization layer 520 provides an abstraction layer from which the following examples of virtual entities may be provided: virtual servers 521; virtual storage 522; virtual networks 523, including virtual private networks; virtual applications and operating systems 524; and virtual clients 525.

In one example, management layer 530 provides the functions described below. Resource provisioning 531 provides dynamic procurement of computing resources and other resources that are utilized to perform tasks within the cloud computing environment. Metering and Pricing 532 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 533 provides access to the cloud computing environment for consumers and system administrators. Service level management 534 provides cloud computing resource allocation and management such that required service levels are met. Service Level Agreement (SLA) planning and fulfillment 535 provide pre-arrangement for, and procurement of, cloud computing resources for which a future requirement is anticipated in accordance with an SLA.

Workloads layer 540 provides examples of functionality for which the cloud computing environment can be utilized. Examples of workloads and functions that can be provided from this layer include: mapping and navigation 541; software development and lifecycle management 542; virtual classroom education delivery 543; data analytics processing 544; transaction processing 545; and generating suggested text based on global assessment of a document 546.

The present disclosure may be a system, a method, and/or a computer program product. The computer program product may include a computer readable storage medium (or media) having computer readable program instructions thereon for causing a processor to carry out aspects of the present disclosure.

The computer readable storage medium is a tangible device that can retain and store instructions for use by an instruction execution device. Examples of computer readable storage media can include an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a component, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the present disclosure.

What is claimed is:

1. A method of generating text change suggestions, comprising:
    receiving a document comprising portions, wherein each of the portions includes at least two words;
    generating portion scores corresponding to the portions;
    generating a global assessment score for the document;
    determining, for the portion scores, variations from the global assessment score;
    determining that the variations include at least two variations below a threshold variation and a variation above the threshold variation;
    selecting consistent portions from the portions based on the variations, wherein the consistent portions correspond to portion scores with variations from the at least two variations below the threshold variation;
    generating a language model for the document based on the consistent portions;
    selecting an inconsistent portion from the portions based on the variations, wherein the inconsistent portion corresponds to a portion score with the variation above the threshold variation; and
    generating, based on the language model, at least one text change suggestion for the inconsistent portion.

2. The method of claim 1, wherein the global assessment score and the portion scores are based on semantic artifacts.

3. The method of claim 2, wherein the semantic artifacts include at least one semantic artifact selected from the group consisting of bias-based semantic artifacts, correctness-based semantic artifacts, and coherence-based semantic artifacts.

4. The method of claim 1, wherein the global assessment score and the portion scores are based on semantic artifacts and contributor scores.

5. The method of claim 1, wherein the at least one text change suggestion is generated using style-based transformers.

6. The method of claim 1, further comprising:
    identifying at least one leader from at least two contributors to the document; and
    generating the global assessment score based on portion scores for portions of the document contributed by the at least one leader.

7. The method of claim 1, wherein the at least one text change suggestion indicates that the inconsistent portion contains information that contradicts information in the consistent portions.

8. A system, comprising:
    at least one processing component;
    at least one memory component;
    a display screen configured to display a document;
    a dictionary; and
    an editing module, comprising:
        an assessment module configured to:
            receive a document comprising portions, wherein each of the portions includes at least two words;
            generate portion scores corresponding to the portions;
            generate a global assessment score for the document;
            determine, for the portion scores, variations from the global assessment score;
            determine that the variations include at least two variations below a threshold variation and a variation above the threshold variation;
            select consistent portions from the portions based on the variations, wherein the consistent portions correspond to portion scores with variations from the at least two variations below the threshold variation; and
            select an inconsistent portion from the portions based on the variations, wherein the inconsistent portion corresponds to a portion score with the variation above the threshold variation; and
        a suggestion module configured to:
            generate a language model for the document based on the consistent portions; and
            generate, based on the language model, at least one text change suggestion for the inconsistent portion.

9. The system of claim 8, wherein the global assessment scores and the portion scores are based on semantic artifacts.

10. The system of claim 9, wherein the semantic artifacts include at least one semantic artifact selected from the group consisting of bias-based semantic artifacts, correctness-based semantic artifacts, and coherence-based semantic artifacts.

11. The system of claim 8, global assessment score and the portion scores are based on semantic artifacts and contributor scores.

12. The system of claim 8, wherein the assessment module is further configured to:
    identify at least one leader from at least two contributors to the document; and
    generate the global assessment score based on portion scores for portions of the document contributed by the at least one leader.

13. The system of claim 8, wherein the at least one text change suggestion indicates that the inconsistent portion contains information that contradicts information in the consistent portions.

14. The system of claim 8, further comprising a set of contributor profiles.

15. A computer program product for generating text change suggestions, the computer program product comprising a computer readable storage medium having program instructions embodied therewith, the program instructions executable by a processor to cause the device to perform a method, the method comprising:

receiving a document comprising portions, wherein each of the portions includes at least two words;

generating portion scores corresponding to the portions;

generating a global assessment score for the document;

determining, for the portion scores, variations from the global assessment score;

determining that the variations include at least two variations below a threshold variation and a variation above the threshold variation;

selecting consistent portions from the portions based on the variations, wherein the consistent portions correspond to portion scores with variations from the at least two variations below the threshold variation;

generating a language model for the document based on the consistent portions;

selecting an inconsistent portion from the portions based on the variations, wherein the inconsistent portion corresponds to a portion score with the variation above the threshold variation; and generating, based on the language model, at least one text change suggestion for the inconsistent portion.

16. The computer program product of claim 15, wherein the global assessment score and the portion scores are based on semantic artifacts.

17. The computer program product of claim 16, wherein the semantic artifacts include at least one semantic artifact selected from the group consisting of bias-based semantic artifacts, correctness-based semantic artifacts, and coherence-based semantic artifacts.

18. The computer program product of claim 15, wherein the global assessment score and the portion scores are based on semantic artifacts and contributor scores.

19. The computer program product of claim 15, wherein the at least one text change suggestion is generated using style-based transformers.

20. The computer program product of claim 15, further comprising:

identifying at least one leader from at least two contributors to the document; and generating the global assessment score based on portion scores for portions of the document contributed by the at least one leader.

\* \* \* \* \*